(12) United States Patent
Xu et al.

(10) Patent No.: US 10,970,901 B2
(45) Date of Patent: Apr. 6, 2021

(54) SINGLE-PHOTO GENERATING DEVICE AND METHOD AND NON-VOLATILE COMPUTER-READABLE MEDIA THEREOF

(71) Applicant: Wistron Corp., New Taipei (TW)

(72) Inventors: Cheng Yan Xu, New Taipei (TW); Qi Cao, New Taipei (TW)

(73) Assignee: WISTRON CORP., New Taipei (TW)

( * ) Notice: Subject to any disclaimer, the term of this patent is extended or adjusted under 35 U.S.C. 154(b) by 49 days.

(21) Appl. No.: 16/359,950

(22) Filed: Mar. 20, 2019

(65) Prior Publication Data

US 2020/0126278 A1  Apr. 23, 2020

(30) Foreign Application Priority Data

Oct. 18, 2018 (CN) .......................... 201811216968.2

(51) Int. Cl.
| | |
|---|---|
| *G06K 9/00* | (2006.01) |
| *G09G 5/02* | (2006.01) |
| *G06T 11/60* | (2006.01) |
| *G06T 7/11* | (2017.01) |
| *G06T 7/174* | (2017.01) |
| *G06T 7/194* | (2017.01) |

(52) U.S. Cl.
CPC .......... *G06T 11/60* (2013.01); *G06K 9/00228* (2013.01); *G06K 9/00362* (2013.01); *G06T 7/11* (2017.01); *G06T 7/174* (2017.01); *G06T 7/194* (2017.01); *G06T 2207/30201* (2013.01)

(58) Field of Classification Search
USPC ........ 382/100, 103, 115–119, 155, 162, 168, 382/173, 181, 190, 209, 220, 232, 254, 382/276, 286–291, 305, 312, 284; 345/473, 589
See application file for complete search history.

(56) References Cited

U.S. PATENT DOCUMENTS

| | | | | |
|---|---|---|---|---|
| 9,779,287 | B2* | 10/2017 | Steinberg | G06K 9/00208 |
| 2006/0192784 | A1* | 8/2006 | Yamaji | G11B 27/02 |
| | | | | 345/473 |
| 2010/0238191 | A1* | 9/2010 | Lee | G06K 9/00677 |
| | | | | 345/589 |
| 2012/0082401 | A1* | 4/2012 | Berger | G06F 16/5866 |
| | | | | 382/306 |
| 2017/0111629 | A1* | 4/2017 | Chen | H04N 13/156 |
| 2017/0193588 | A1* | 7/2017 | Loui | G06F 7/026 |
| 2019/0080155 | A1* | 3/2019 | Ganong | G06K 9/00261 |

FOREIGN PATENT DOCUMENTS

| | | |
|---|---|---|
| CN | 104574397 A | 4/2015 |
| CN | 106604011 A | 4/2017 |
| CN | 108198162 A | 6/2018 |
| TW | I263946 B | 10/2006 |

* cited by examiner

*Primary Examiner* — Seyed H Azarian (57) ABSTRACT

A single-photo generating device is provided. The single-photo generating device includes an image capturing device and a processing device. The image capturing device generates a first image, wherein the first image includes a plurality of people. The processing device is coupled to the image capturing device and obtains the first image from the image capturing device. The processing device extracts each human image corresponding to the plurality of people from the first image and selects a background image, and the processing device generates a plurality of single photos corresponding to each human image according to the extracted human images and the background image.

13 Claims, 8 Drawing Sheets

SINGLE-PHOTO GENERATING DEVICE AND METHOD AND NON-VOLATILE COMPUTER-READABLE MEDIA THEREOF

CROSS REFERENCE TO RELATED APPLICATIONS

This application claims priority of CN Patent Application No. 201811216968.2 filed on Oct. 18, 2018, the entirety of which is incorporated by reference herein.

BACKGROUND OF THE INVENTION

Field of the Invention

The invention generally relates to single-photo generating technology, and more particularly, to single-photo generating technology for generating a plurality of single photos according the human images in a group photo.

Description of the Related Art

As technology progresses, electronic devices or mobile devices that can take photographs are indispensable in everyone's life. However, at a social function with multiple attendees (e.g. a dinner with colleagues or a class reunion), a user may want to individually take a picture of each person attending the event using his electronic device or mobile device with photo-taking functionality, this will waste the user's time because there are too may attendees. Therefore, how to efficiently generate a single photo of each person is a subject that is worthy of discussion.

BRIEF SUMMARY OF THE INVENTION

According to embodiments of the invention, a single-photo generating device and method, and non-volatile computer-readable media for generating a plurality of single photos according the human images in a group photo to overcome the problems mentioned above.

An embodiment of the invention provides a single-photo generating device. The single-photo generating device comprises an image capturing device and a processing device. The image capturing device generates a first image, wherein the first image comprises a plurality of people. The processing device is coupled to the image capturing device and obtains the first image from the image capturing device. The processing device extracts each human image corresponding to the plurality of people from the first image and selects a background image, and the processing device generates a plurality of single photos corresponding to each human image according to the extracted human images and the background image.

An embodiment of the invention provides a single-photo generating method. The single-photo generating method comprises steps of generating a first image, wherein the first image comprises a plurality of people; extracting each human image corresponding to the plurality of people from the first image; selecting a background image; and generating a plurality of single photos corresponding to each human image according to the extracted human images and the background image.

An embodiment of the invention provides a non-volatile computer-readable media storing a computer program product. The non-volatile computer-readable media is configured to perform steps of generating a first image, wherein the first image comprises a plurality of people; extracting each human image corresponding to the plurality of people from the first image; selecting a background image; and generating a plurality of single photos corresponding to each human image according to the extracted human images and the background image.

Other aspects and features of the invention will become apparent to those with ordinary skill in the art upon review of the following descriptions of specific embodiments of single-photo generating devices and methods, and non-volatile computer-readable media.

BRIEF DESCRIPTION OF THE DRAWINGS

The invention will become more fully understood by referring to the following detailed description with reference to the accompanying drawings, wherein.

DETAILED DESCRIPTION OF THE INVENTION

The descriptions of the invention are some embodiments for the purpose of illustrating the general principles of the invention and should not be configured to limit the invention. The scope of the invention is determined by reference to the appended claims.

Figure 1:
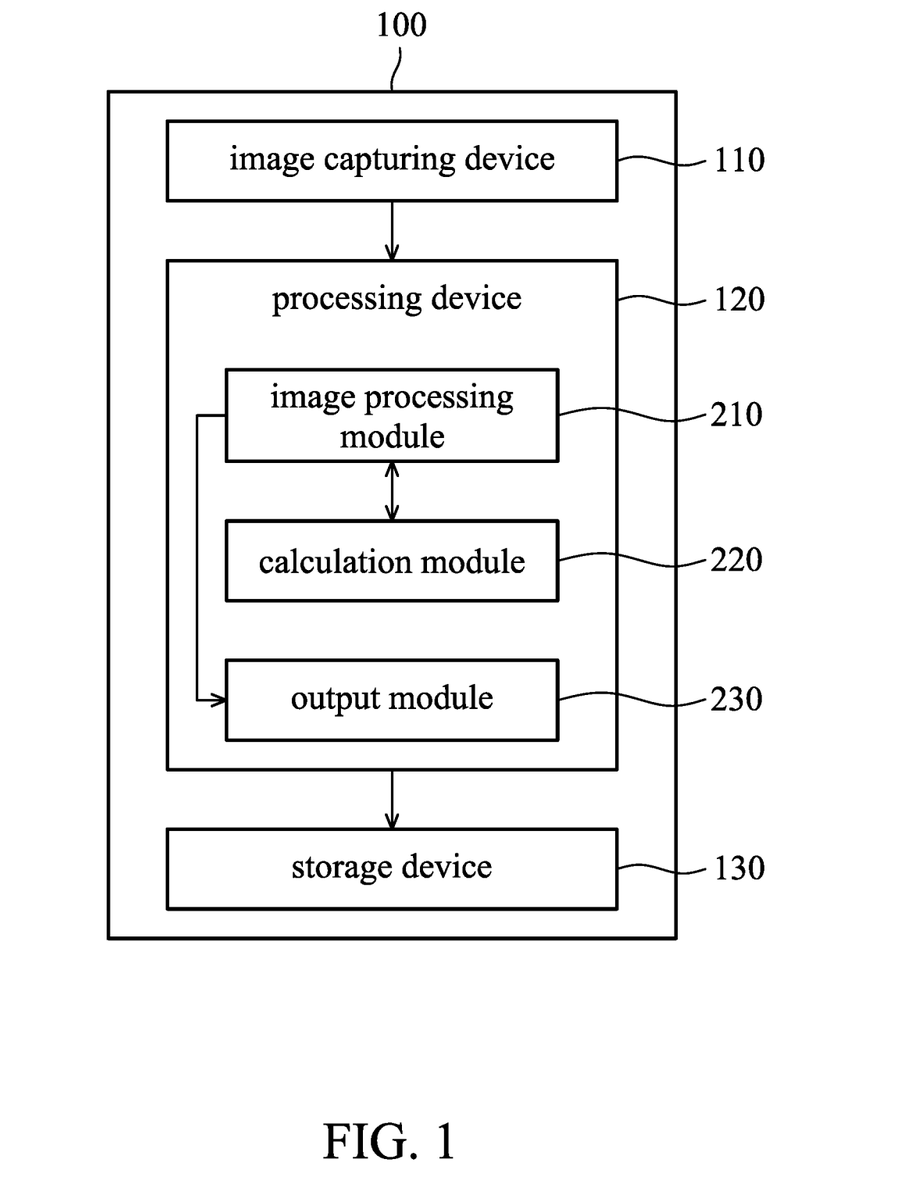
FIG. 1 is a block diagram of a system performance control device 100 according to an embodiment of the invention.

FIG. 1 is a block diagram of a single-photo generating device 100 according to an embodiment of the invention. As shown in FIG. 1, the single-photo generating device 100 may comprise an image capturing device 110, a processing device 120 and a storage device 130. It should be noted that, FIG. 1 presents a simplified block diagram in which only the elements relevant to the embodiment of the invention are shown. However, the invention should not be limited to what is shown in FIG. 1. The single-photo generating device 100 also can comprise other elements.

According to an embodiment of the invention, the single-photo generating device 100 may be an electronic device with a photo function, e.g. a smartphone, a tablet, a digital camera, a video camera, and so on. In addition, the image capturing device 110 may be a camera, a monitor device or an imaging lens.

According to the embodiments of the invention, the processing device 120 may be a processor. As shown in FIG. 1, the processing device 120 may comprise an image processing module 210, a calculation module 220 and an output module 230. The processing device may perform the related operations of the image processing module 210, the calculation module 220 and the output module 230.

According to the embodiments of the invention, the storage device 130 may be configured to store the software and firmware, system data, user's data, image data, and so on. The storage device 130 may be a volatile memory (e.g. random access memory (RAM)), a non-volatile memory (e.g. flash memory, read only memory (ROM)), a hard disk, or any combination thereof.

According to the embodiments of the invention, when the user wants to obtain each person's single-photo, the user may take a group photo, and then use the group photo to generate the single-photo of each person in the group photo. Specifically, the user may use the single-photo generating device 100 to take a group photo of a plurality of people. The image capturing device 110 of the single-photo generating device 100 may photo the plurality of people. After the image capturing device 110 photos the plurality of people, the image capturing device 110 may generate a first image, and transmit the first image to the processing device 120. When the processing device 120 obtains the first image, the processing device 120 may generate the single-photo of each person in the first image. According to an embodiment of the invention, the first image and each single-photo may have the same size. Details for generating the single-photo of each person will illustrate below.

According to an embodiment of the invention, when the processing device 120 obtains the first image, the image processing module 210 of the processing device 120 may perform human recognition for the people comprised in the first image according to a human recognition algorithm to obtain the feature information corresponding to each human image (person) comprised in the first image. According to an embodiment of the invention, the feature information corresponding to each human image (person) may comprise the facial parameters, body parameters and tonality parameters, but the invention should not be limited thereto. For example, in a human recognition algorithm, the image processing module 210 may recognize each person's facial contour and facial feature to obtain the facial parameters (e.g. the facial shape, the distance between the eye lids, the distance or proportion between the eyes, the nose shape, the distance or proportion between the nose and the mouth corner, the distance or proportion between the nose and the eyes, the distances between the ears, and so on) corresponding to each human image (person). Then, the image processing module 210 may recognize the body from the head along an extension direction (e.g. from the head to the body and from the head to the limbs). For example, the image processing module 210 may extend downward a default length from the head and extend to both sides a default length from the head to define an extension range, and in the extension range, the image processing module 210 may recognize each person's head contour, shoulder contour, the distance or proportion between the elbow joint and the shoulder, the distance or proportion between the elbow joint and the arm, the length of arm, the proportion between the arm and the body, the length of leg, the proportion between the leg and the body, the length and proportion of limbs, and so on, to obtain the body parameters (e.g. the body features, proportion between the trunk and the whole body, the body contour, and so on) corresponding to each human image (person). In addition, in the extension range, the image processing module 210 may recognize the tonality of each person to obtain the tonality parameters corresponding to each human image (person). For example, the tonality parameters may comprise each person's clothing tonality, skin tonality, hair tonality, but the invention should not be limited thereto. After the image processing module 210 obtains the feature information (e.g. facial parameters, body parameters and/or tonality parameters) corresponding to each human image (person), the image processing module 210 may store the feature information corresponding to each human image (person) in the storage device 130. While the image processing module 210 generates the single-photo corresponding to each human image (person), the image processing module 210 may generate the single-photo corresponding to each human image (person) according to the feature information stored in the storage device 130.

According to the embodiments of the invention, while the single-photo generating device 100 generates the single-photo of each person, the image processing module 210 of the processing device 120 may generate a background image first, wherein the background image will be taken to be the background of each single-photo. Details for generating the background image will illustrate below.

According to an embodiment of the invention, the image direction of the background image generated by the image processing module 210 is the same as the image direction of the first image. For example, if the image direction of the first image is landscape, the image direction of the background image generated by the image processing module 210 will also be landscape. If the image direction of the first image is portrait, the image direction of the background image generated by the image processing module 210 will also be a portrait.

According to an embodiment of the invention, while the image processing module 210 generates the background image, the image processing module 210 may select a plurality of second images from the first image. Then, the image processing module 210 may select one of the second images to be the background image. In the embodiment of the invention, each second image does not comprise any person. Furthermore, in the embodiment, the size (i.e. second size) of each second image may be smaller than the size (i.e. first size) of the first image, and the image direction of each second image is the same as the image direction of the first image.

According to an embodiment of the invention, the calculation module 220 of the processing device 120 may determine how many people are there in the first image, and determine the size of the second image according the number of people in the first image. In an embodiment, if there are n people in the first image, the calculation module 220 may set the size of the second image to 1/3n the size of the first image, but the invention should not be limited thereto. For example, if the calculation module 220 of the processing device 120 determines that there are 3 people in the first image by recognizing the facial contours and facial features, the calculation module 220 may set the size of the second image to 1/9th the size of the first image. After the calculation module 220 determines the size of the second image, the image processing module 210 may select the appropriate second images from areas where there are no people in the first image according to the size of the second image.

According to a first embodiment of the invention, the image processing module 210 may select the second images in sequence from the first image according to a first direction (e.g. a horizontal direction) and a second direction (e.g. a vertical direction). For example, if the image processing module 210 may select the second images from the upper left corner of the first image to the lower right corner of the first image, the image processing module 210 may select the appropriate second images from the first row of the first image along the horizontal direction. Then, the image processing module 210 may select the appropriate second images from the second row of the first image along the horizontal direction. Accordingly, the image processing module 210 may select the appropriate second images until the image processing module 210 has selected the appropriate second images at the lower right corner of the first image. In an embodiment, after the image processing module 210 generates the second images, the user can select one of the second images to be the background of each single-photo. Then, the image processing module 210 may one of the second images to be the background image according to the selection result of the user. In another embodiment, the image processing module 210 may directly select first one of the second images to be the background of each single-photo. Furthermore, in the first embodiment, while the image processing module 210 selects the second images, the image processing module 210 may select a second image every default interval.

According to a second embodiment of the invention, the image processing module 210 may select the second images from the area which has the maximum distance from a person in the first image or from the area which has the minimum distance from a person in the first image. In an embodiment, after the image processing module 210 selects the second images, the user can select one of the second images to be the background of each single-photo. In another embodiment, the user may select an area which has the maximum distance from a person or an area which has the minimum distance from a person, and then the image processing module 210 may selects the background image from the second images according to the selection result of the user. It should be noted that in the second embodiment, because the maximum distance and minimum distance for each person in the first image may be different, therefore, the image processing module 210 can also select the corresponding second image of each person from the first image. Namely, each person may correspond to different background image.

In the first embodiment and the second embodiment, after the image processing module 210 selects the background image from the second images, according to the proportion of the first size and the second size, the image processing module 210 may minify the human images (correspond to each person in the first image) extracted by the image processing module 210. Then, the image processing module 210 may composite each minified human image with the selected second image (i.e. background image) according to the position of each person in the first image. Finally, the image processing module 210 may magnify the size of the composition images to the first size to generate the single photos of each person. FIGS. 3A-3G and FIGS. 4A-4G will be taken for example below.

Figure 6A:
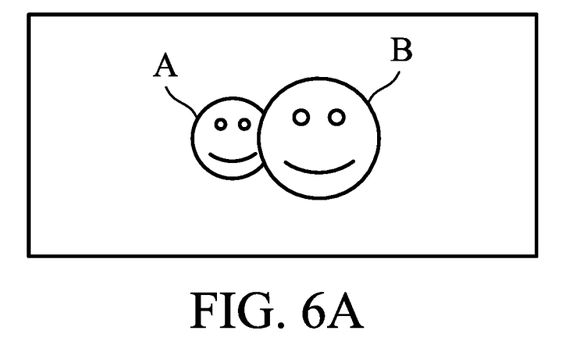
FIGS. 6A-6C are schematic diagrams of the single photos which have overlap part according to an embodiment of the invention.
Figure 6B:
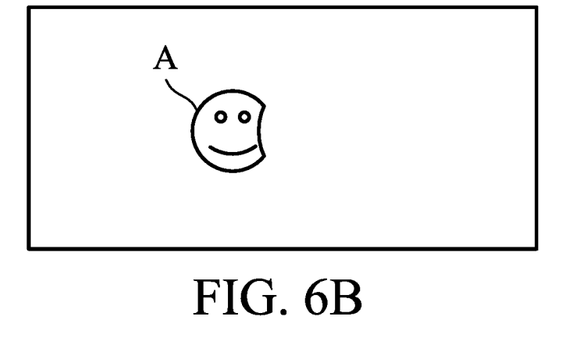
Figure 6C:
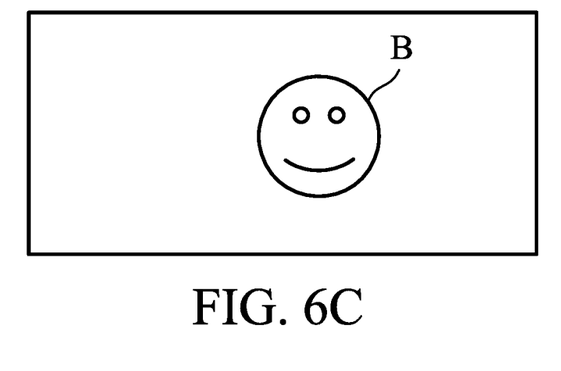

According to a third embodiment of the invention, the image processing module 210 may generate a mono-color background with the first size to be the background of each single-photo of each person in the first image. In an embodiment, the user may select one color to generate the mono-color background image. In another embodiment, the image processing module 210 may recognize the tonality of the first image to select the color corresponding to the first image to generate the mono-color background image. After the image processing module 210 generates the mono-color background (i.e. the background image), the image processing module 210 may composite each extracted human image with the mono-color background (i.e. background image) to generate each single-photo of each person. FIGS. 6A-6C will be taken for example below.

According to a fourth embodiment of the invention, the image processing module 210 may select a second image from the area comprising a particular object in the first image to serve as the background image of each single-photo of each person in the first image. In an embodiment, the user can select the particular object of the background image. Then, the image processing module 210 may select the second image from the first image based on the position of the particular object in the first image.

Figure 2:
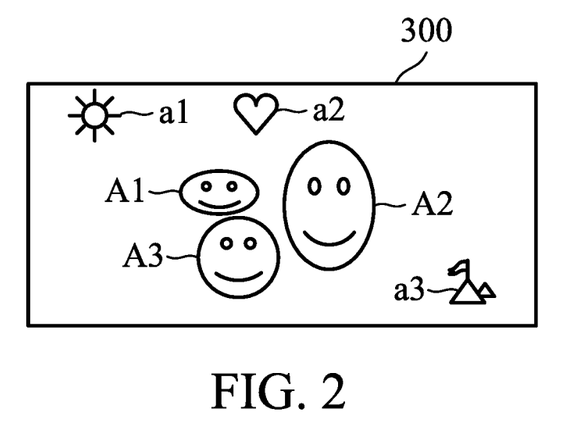
FIG. 2 is a schematic diagram of a first image according to an embodiment of the invention.

FIG. 2 is a schematic diagram of a first image according to an embodiment of the invention. As shown in FIG. 2, the first image 300 comprises a first human image A1, a second human image A2, a third human image A3, a first object a1, a second object a2 and a third object a3.

Figure 3A:
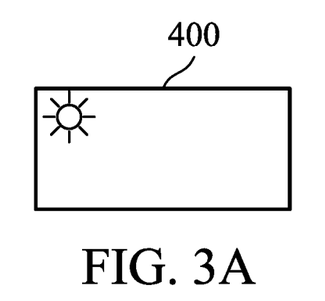
FIGS. 3A-3G are schematic diagrams of a plurality of single photos according to a first embodiment of the invention.
Figure 3B:
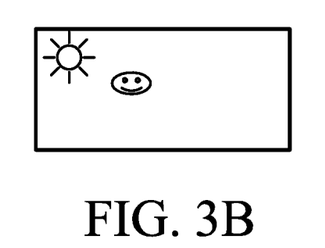
Figure 3C:
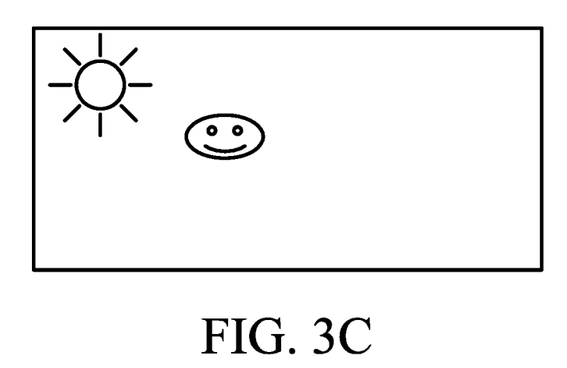
Figure 3D:
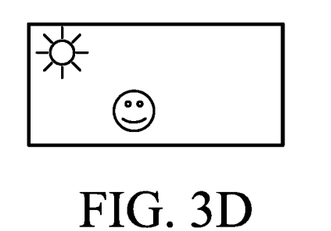
Figure 3E:
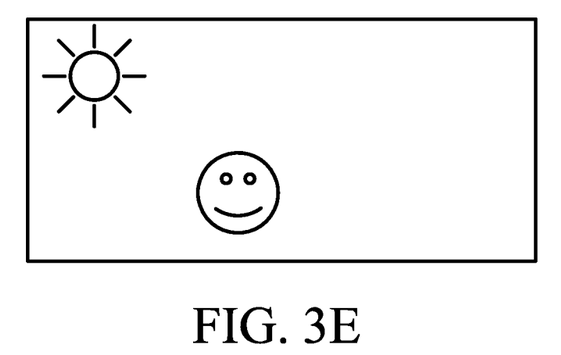
Figure 3F:
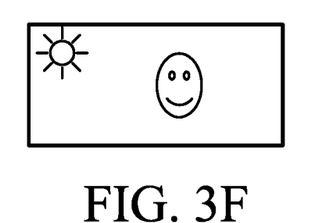
Figure 3G:
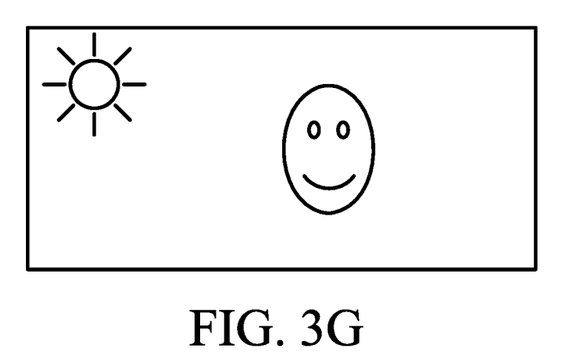

FIGS. 3A-3G are schematic diagrams of a plurality of single photos according to a first embodiment of the invention. Taking FIG. 2 for example, while the image processing module 210 generates the background image according to the method of the first embodiment, the image processing module 210 may select a plurality of second images from the areas that do not comprise the first human image A1, the second human image A2, and the third human image A3 in the first image 300 and then the image processing module 210 may select a second image 400 (as shown in FIG. 3A) from the second images. Then, the image processing module 210, the image processing module 210 may minify the first human image A1, the second human image A2, and the third human image A3 according to the proportion of the size of the first image 300 (i.e. first size) and the size of the second image 400 (i.e. second size). Then, the image processing module 210 may composite the minified first human image A1, second human image A2, and third human image A3 with the selected second image 400 (i.e. background image) respectively according to the positions of the minified first human image A1, second human image A2, and third human image A3 in the first image 300 (as shown in FIGS. 3B, 3D and 3F). Finally, the image processing module 210 may magnify the size of the composition images to the size of the first image 300 (as shown in FIGS. 3C, 3E and 3G) to generate the single photos corresponding to the first human image A1, second human image A2, and third human image A3.

Figure 4A:
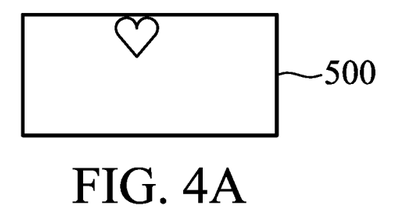
FIGS. 4A-4G are schematic diagrams of a plurality of single photos according to a second embodiment of the invention.
Figure 4B:
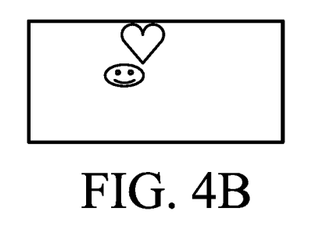
Figure 4C:
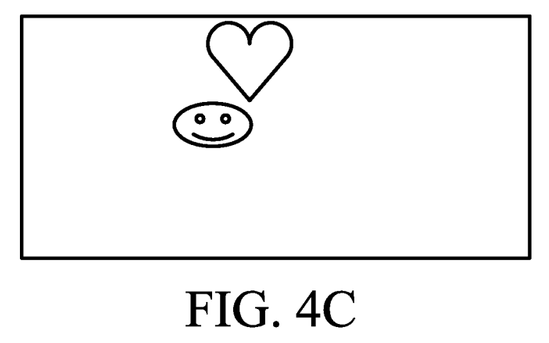
Figure 4D:
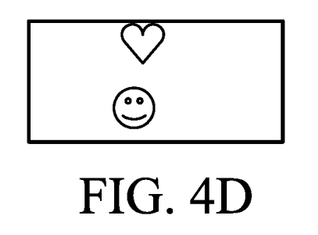
Figure 4E:
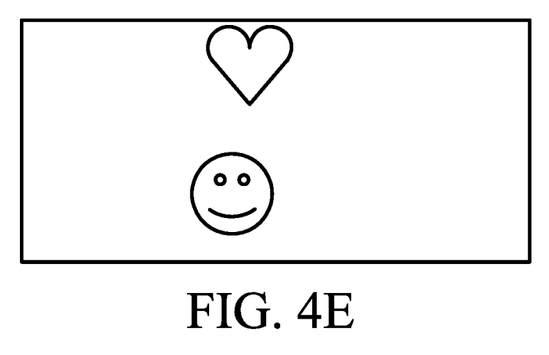
Figure 4F:
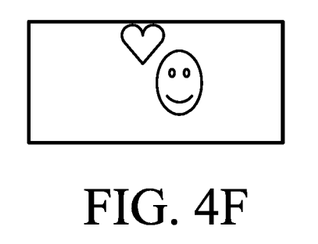

FIGS. 4A-4G are schematic diagrams of a plurality of single photos according to a second embodiment of the invention. Taking FIG. 2 for example, while the image processing module 210 generates the background image according to the method of the second embodiment, if the image processing module 210 may select the area which has the minimum distance from the first human image A1 in the first image 300, the image processing module 210 may select the second image 500 (as shown in FIG. 4A) from the area which has the minimum distance from the first human image A1 in the first image 300. Then, the image processing module 210 may minify the first human image A1, the second human image A2, and the third human image A3 according to the proportion of the size of the first image 300 (i.e. first size) and the size of the second image 400 (i.e. second size). Then, the image processing module 210 may composite the minified first human image A1, second human image A2, and third human image A3 with the selected second image 500 (i.e. background image) respectively according to the positions of the minified first human image A1, second human image A2, and third human image A3 in the first image 300 (as shown in FIGS. 4B, 4D and 4F).

Figure 4G:
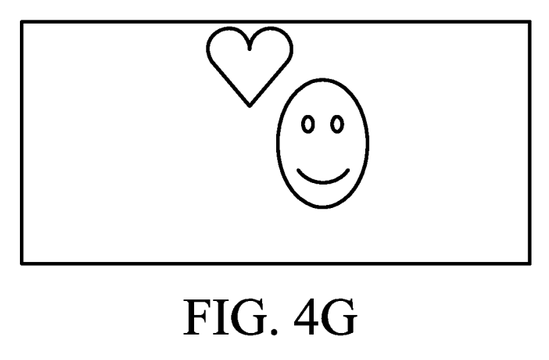

Finally, the image processing module 210 may magnify the size of the composition images to the size of the first image 300 (as shown in FIGS. 4C, 4E and 4G) to generate the single photos corresponding to the first human image A1, second human image A2, and third human image A3.

Figure 5A:
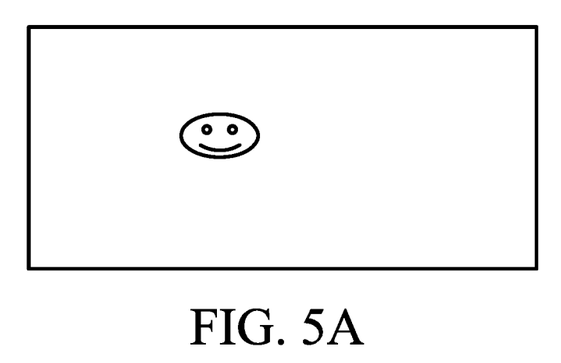
FIGS. 5A-5C are schematic diagrams of a plurality of single photos according to a third embodiment of the invention.
Figure 5B:
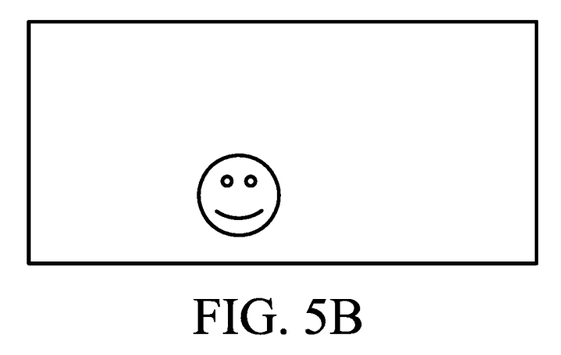
Figure 5C:
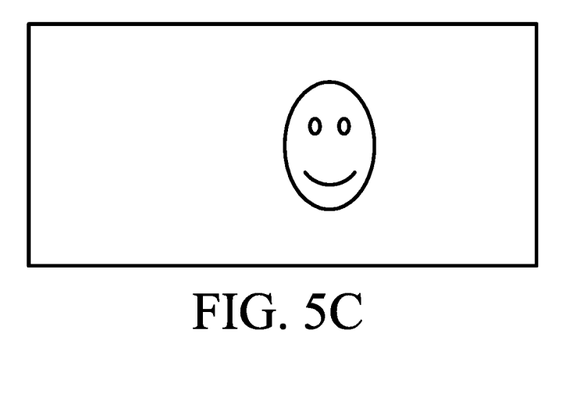

FIGS. 5A-5C are schematic diagrams of a plurality of single photos according to a third embodiment of the invention. Taking FIG. 2 for example, while the image processing module 210 generates the background image according to the method of the third embodiment, the image processing module 210 may select a mono-color background to be the background of the first human image A1, second human image A2, and third human image A3 (as shown in FIGS. 5A-5C).

In addition, while the image processing module 210 generates the background image according to the method of the fourth embodiment, if the image processing module 210 selects the first object a1 to be the background of the first human image A1, second human image A2, and third human image A3, the image processing module 210 may select a second image (i.e. the background image) from the area comprising the first object a1 in the first image 300 to generate the single photos corresponding to the first human image A1, second human image A2, and third human image A3.

According to an embodiment of the invention, after the image processing module 210 generates the single photos of each person in the first image, the image processing module 210 may transmit the single photos to the output module 230. The output module 230 may output the single photos to the storage device 130 to store the single photos, or output the single photos to a display device (not shown in figures) to display the single photos of each person in the first image.

Figure 7A:
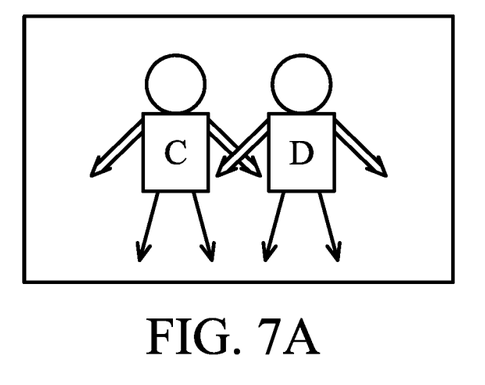
FIGS. 7A-7C are schematic diagrams of the single photos which have overlap part according to another embodiment of the invention.
Figure 7B:
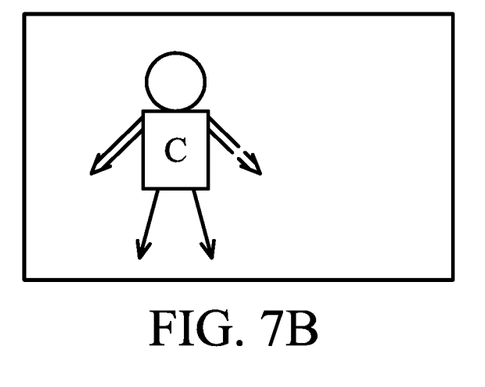
Figure 7C:
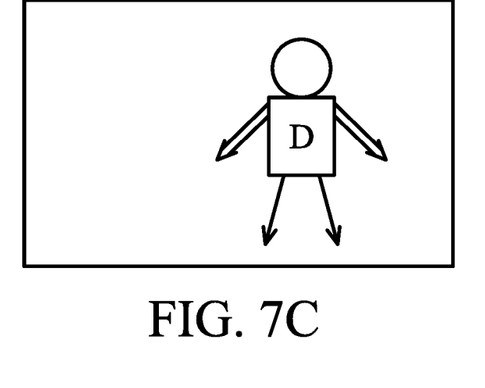

According to an embodiment of the invention, if the people in the first image overlap each other (e.g. the body of the person (e.g. B) in front blocks partial body of the person (e.g. A) behind), while the image processing module 210 generates the single photos, the image processing module 210 may extract the human image A and human image B according to the feature information of the human image A and the human image B which is stored in the storage device 130 to generate the single photos corresponding to the human image A and human image B, and the image processing module 210 may keep the overlap part for the person in front (e.g. human image B). FIGS. 6A-6C are taken for example below. As shown in FIG. 6A, partial human image A overlaps with partial human image B. Therefore, as shown in FIG. 6B, while the image processing module 210 generates the single-photo corresponding to human image A, the single-photo corresponding to human image A may not show the overlap part between the human image A and human image B. That is to say, the overlap part between the human image A and human image B will not be shown in the single-photo corresponding to human image A. In other words, as shown in FIG. 6C, while the image processing module 210 generates the single-photo corresponding to human image B, the single-photo corresponding to human image B may show the complete human image B. FIGS. 7A-7C are further taken for example. As shown in FIG. 7A, the arm of human image C overlaps with the arm of human image D. Therefore, as shown in FIG. 7B, while the image processing module 210 generates the single photos corresponding to the human image C and the human image D, the image processing module 210 may extract the human image C and human image D according to the feature information of the human image C and the human image D which is stored in the storage device 130 to generate the single photos corresponding to the human image C and human image D, and the single-photo corresponding to human image C may not show the overlap part between the human image C and human image D. For example, while the image processing module 210 generates the single-photo corresponding to human image C, according to the feature information of the human image C, the image processing module 210 may erase the image data which is not match the feature information of the human image C in the first image to generate the single-photo corresponding to human image C. That is to say, the partial of arm (blocked by the arm of the human image D) in the human image C will not be shown in the single-photo corresponding to human image C. In other words, as shown in FIG. 7C, while the image processing module 210 generates the single-photo corresponding to human image D, the single-photo corresponding to human image B may show the complete arm of human image D.

According to an embodiment of the invention, the processing device 120 may further comprises a scan module (not shown in figures). Before the first image is generated, the scan module may indicate the image capturing device 110 to detect one or a plurality of people in a scan area to generate a first image. According to an embodiment of the invention, the user can set the scan area in an operation interface (not shown in figures) of the single-photo generating device 100. According to an embodiment of the invention, the number of people that need to be extracted in the scan area may be a default value, and the default value is adjustable. The image capturing device 110 may detect the people in the scan area to generate a group photo (i.e. first image) according to the pre-set number of people that need to be extracted and a human recognition algorithm. According to the embodiments, the user has flexibility in deciding the number of people in the first image. For example, the user can set the number of people to 2, and use the lens (not shown in figures) of image capturing device 110 to photo a plurality of temporary images (e.g. the user uses the lens of image capturing device 110 to rapidly scan the people to generate the temporary Images). The temporary images may be displayed on the scan area in the operation interface. In response to the number of people in a temporary image is equal to the pre-set number of people, the image capturing device 110 may regard the temporary image as the first image. According to the embodiments, when user is in a crowded places (e.g. multi-person gathering place or public place), the user can use the single-photo generating device 100 to obtain the first image which comprises the pre-set number of people. Furthermore, in another embodiment, while the image processing module 210 generates the background image, the size of the second image may be set according to the pre-set number of people, therefore, the calculations for generating the background image will be reduced.

Figure 8:
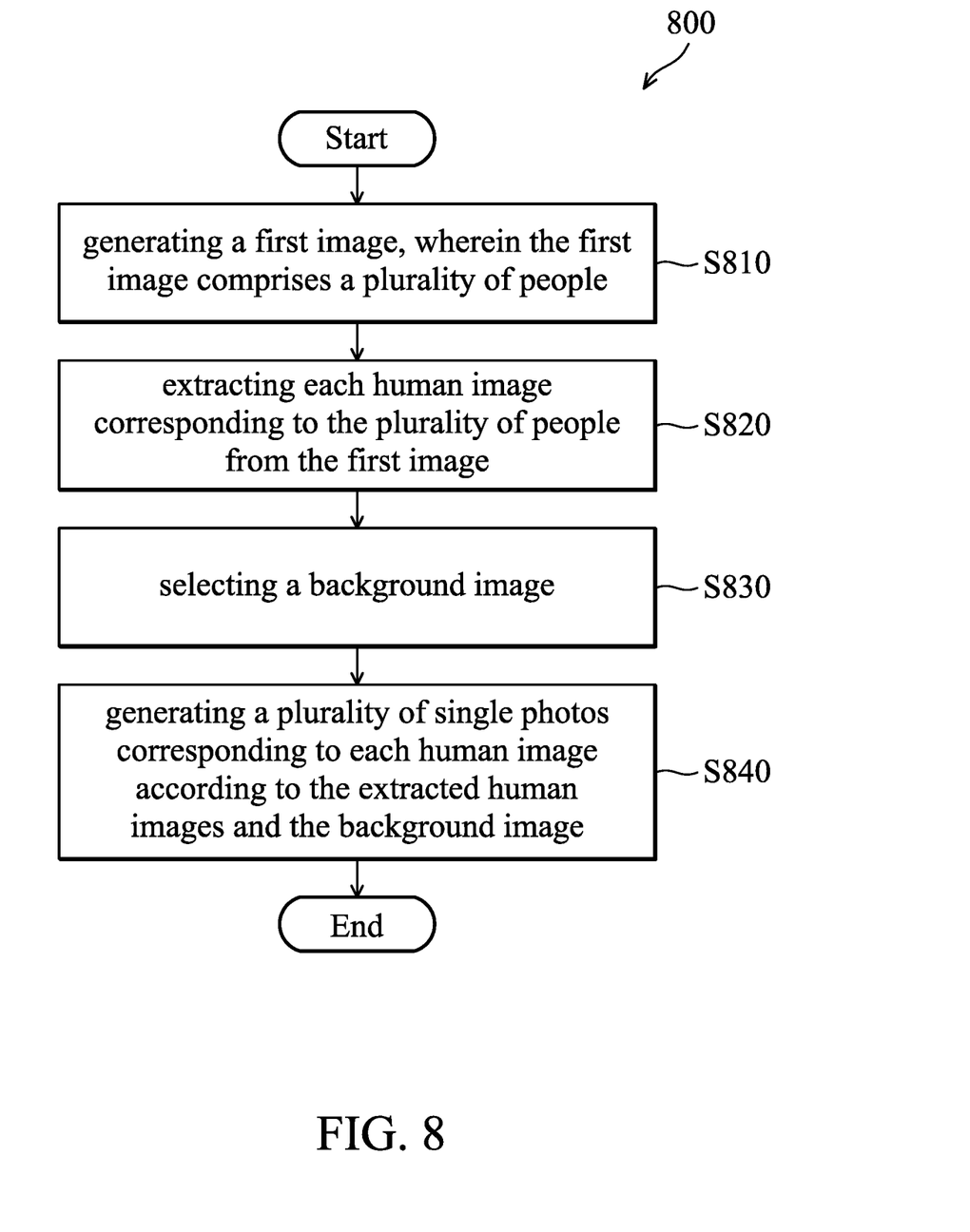
FIG. 8 is a flow chart 800 illustrating a single-photo generating method according to an embodiment of the invention.

FIG. 8 is a flow chart 800 illustrating a single-photo generating method according to an embodiment of the invention. The single-photo generating method can be applied to the single-photo generating device 100. As shown in FIG. 8, in step S810, the single-photo generating device 100 may generate a first image, wherein the first image comprises a plurality of people. In step S820, the single-photo generating device 100 may extract each human image of the plurality of people from the first image. In step S830, the single-photo generating device 100 may select a background image. In step S840, the single-photo generating device 100 may generate the single photos corresponding to each human image according to the each extracted human image and the elected background image. In the embodiment, the first image and the single photos corresponding to each human image may have a first size.

According to an embodiment of the invention, in the single-photo generating method, the background image selected by the single-photo generating device 100 may not comprise the human images.

According to an embodiment of the invention, in the single-photo generating method, the single-photo generating device 100 may select a plurality of second images with a second size from the first image, and select one of the second images to be the background image. In the embodiment of the invention, the second size of the second image is smaller than the first size of the first image.

According to an embodiment of the invention, in the single-photo generating method, the single-photo generating device 100 may determine the number of people in the first image, and determine the second size of the second images according to the number of people in the first image.

According to an embodiment of the invention, in the single-photo generating method, the single-photo generating device 100 may minify the extracted human images according to the proportion of the first size and the second size. Then, the single-photo generating device 100 may composite each minified human image with the selected second image (i.e. background image) according to the position of each human image (or person) in the first image. Then, the single-photo generating device 100 may magnify the size of the composition images to the first size to generate the single photos corresponding to each human image.

According to an embodiment of the invention, in the single-photo generating method, the single-photo generating device 100 may select the second images in sequence from the first image according to a first direction and a second direction. According to another embodiment of the invention, in the single-photo generating method, the single-photo generating device 100 may select the second images from the area which has the maximum distance from a person in the first image or from the area which has the minimum distance from a person in the first image. According to another embodiment of the invention, in the single-photo generating method, the single-photo generating device 100 may select a mono-color background to be the background image. According to another embodiment of the invention, in the single-photo generating method, the single-photo generating device 100 may select a second image which comprises a particular object from the first image to be the background image.

According to an embodiment of the invention, in the single-photo generating method, the single-photo generating device 100 may store the feature information corresponding to each human image. In addition, the single-photo generating device 100 may extract each human image from the first image according to the feature information corresponding to each human image.

According to an embodiment of the invention, in the single-photo generating method, the image direction of the background image is the same as the image direction of the first image.

According to an embodiment of the invention, in the single-photo generating method, the single-photo generating device 100 may perform a computer program product stored in a non-volatile computer-readable media to perform the single-photo generating method of the embodiments of the invention.

According to the single-photo generating method in the embodiments of the invention, the photo generating device 100 can photo a group image to generate the single photos corresponding to each person in the group image. Therefore, according to the single-photo generating method in the embodiments of the invention, the user can obtain the single photos of each person more conveniently.

Use of ordinal terms such as "first", "second", "third", etc., in the disclosure and claims is for description. It does not by itself connote any order relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A single-photo generating device, comprising:
    an image capturing device, generating a first image, wherein the first image comprises a plurality of people; and
    a processing device, coupled to the image capturing device and obtaining the first image from the image capturing device;
    wherein the processing device extracts each human image corresponding to the plurality of people from the first image and selects a background image from the first image, and the processing device generates a plurality of single photos corresponding to each of the human images according to the extracted human images and the background image,
    wherein the background image does not comprise the human images, and
    wherein the first image and the single photos corresponding to each of the human images have a first size, and the processing device selects a plurality of second images with a second size from the first image, and the processing device selects one of the second images to be the background image, wherein the second size is smaller than the first size.

2. The single-photo generating device of claim 1, wherein the processing device determines a number of the plurality of people in the first image, and the processing device determines the second size of the second images according to the number of the plurality of people in the first image.

3. The single-photo generating device of claim 2, wherein the processing device minifies the extracted human images according to a proportion of the first size and the second size, and composites each of the minified human images with the selected second image according to a position of each of the human images in the first image to generate composition images, and magnifies the composition images to the first size to generate the single photos corresponding to each human image.

4. The single-photo generating device of claim 1, wherein the processing device selects the second images in sequence from a first area of the first image to a second area of the first image.

5. The single-photo generating device of claim 1, wherein the processing device selects the second images from an area which has a maximum distance from one of the human images in the first image or which has a minimum distance from one of the human images in the first image.

6. The single-photo generating device of claim 1, further comprising:
a storage device, coupled to the processing device, and storing feature information corresponding to each of human images, wherein the processing device extracts each of the human images from the first image according to the feature information corresponding to each of the human images.

7. A single-photo generating method, applied to a single-photo generating device, comprising:
generating a first image, wherein the first image comprises a plurality of people;
extracting each human image corresponding to the plurality of people from the first image;
selecting a plurality of second images with a second size from the first image;
selecting one of the second images to be a background image; and
generating a plurality of single photos corresponding to each of the human images according to the extracted human images and the background image, wherein the first image and the single photos corresponding to each of the human images have a first size and the second size is smaller than the first size, and wherein the background image does not comprise the human images.

8. The single-photo generating method of claim 7, further comprising:

determining a number of the plurality of people in the first image; and
determining the second size of the second images according to the number of the plurality of people in the first image.

9. The single-photo generating method of claim 8, further comprising:
minifying the extracted human images according to a proportion of the first size and the second size;
compositing each of the minified human images with the selected second image according to a position of each of the human images in the first image to generate composition images; and
magnifying the composition images to the first size to generate the single photos corresponding to each human image.

10. The single-photo generating method of claim 7, further comprising:
selecting the second images in sequence from a first area of the first image to a second area of the first image.

11. The single-photo generating method of claim 7, further comprising:
selecting the second images from an area which has a maximum distance from one of the human images in the first image or which has a minimum distance from one of the human images in the first image.

12. The single-photo generating method of claim 7, further comprising:
storing feature information corresponding to each of the human images; and
extracting each of the human images from the first image according to the feature information corresponding to each of the human images.

13. A non-transitory computer-readable medium storing a computer program including instructions that, when executed by a processing device of a single-photo generating device, causes the single-photo generating device to:
generate a first image, wherein the first image comprises a plurality of people;
extract each human image corresponding to the plurality of people from the first image;
select a plurality of second images with a second size from the first image;
select one of the second images to be a background image; and
generate a plurality of single photos corresponding to each of the human images according to the extracted human images and the background image, wherein the first image and the single photos corresponding to each of the human images have a first size and the second size is smaller than the first size, and wherein the background image does not comprise the human images.

* * * * *